(12) United States Patent
Chippas

(10) Patent No.: US 7,980,907 B1
(45) Date of Patent: Jul. 19, 2011

(54) AMPHIBIOUS PADDLE TRACK PROPULSION SYSTEM

(76) Inventor: Louis H. Chippas, West Palm Beach, FL (US)

( * ) Notice: Subject to any disclaimer, the term of this patent is extended or adjusted under 35 U.S.C. 154(b) by 0 days.

(21) Appl. No.: 12/941,443

(22) Filed: Nov. 8, 2010

Related U.S. Application Data

(63) Continuation-in-part of application No. 12/454,855, filed on Jul. 27, 2009, now abandoned.

(60) Provisional application No. 61/131,473, filed on Jun. 9, 2008.

(51) Int. Cl.
*B63H 1/34* (2006.01)

(52) U.S. Cl. .......................................... 440/97

(58) Field of Classification Search .............. 440/95–97, 440/12.56; 180/9.1–9.64
See application file for complete search history.

(56) References Cited

U.S. PATENT DOCUMENTS

| | | |
|---|---|---|
| 121,738 A | 12/1871 | Whitehead |
| 413,852 A | 10/1889 | French |
| 464,621 A | 12/1891 | Fisher |
| 583,762 A | 6/1897 | Moore |
| 921,823 A | 5/1909 | Gays |
| 1,729,974 A | 10/1929 | Watson |
| 1,869,136 A | 7/1932 | Farraguto |
| 1,928,511 A | 9/1933 | Martin |
| 2,416,128 A | 2/1947 | Swennes |
| 2,878,883 A | 3/1959 | France et al. |
| 2,916,006 A | 12/1959 | Crandall |
| 2,980,054 A | 4/1961 | Sanders |
| 3,063,401 A * | 11/1962 | Patee .................... 440/12.63 |
| 3,353,618 A | 11/1967 | Fisher |
| 4,511,338 A | 4/1985 | Fanelli |
| 4,772,237 A | 9/1988 | Zalkauskas |
| 5,226,843 A | 7/1993 | Yun |
| 6,083,065 A | 7/2000 | Hall |
| 2009/0298360 A1 | 12/2009 | Chippas |
| 2009/0305585 A1 | 12/2009 | Chippas Reilly |

* cited by examiner

*Primary Examiner* — Ed Swinehart
(74) *Attorney, Agent, or Firm* — Malin Haley DiMaggio Bowen & Lhota, P.A.

(57) ABSTRACT

An amphibious self-engaging paddle track propulsion system mountable on any floater, vessel or vehicle for enabling the ability to selectively travel over land or water, the system having an elongated endless paddle track, plurality of spring-loaded paddles, plurality of paddle supporting terrain treads, plurality of terrain treads, drive sprocket, chain sprocket, rear sprocket, frame, drive sprocket axle and rear sprocket axle wherein the terrain treads are secured to the paddle track and the paddles are secured to certain terrain treads wherein the halter and paddle are hinged together for allowing the retraction and extension of the paddle for land and water locomotion, respectively.

10 Claims, 11 Drawing Sheets

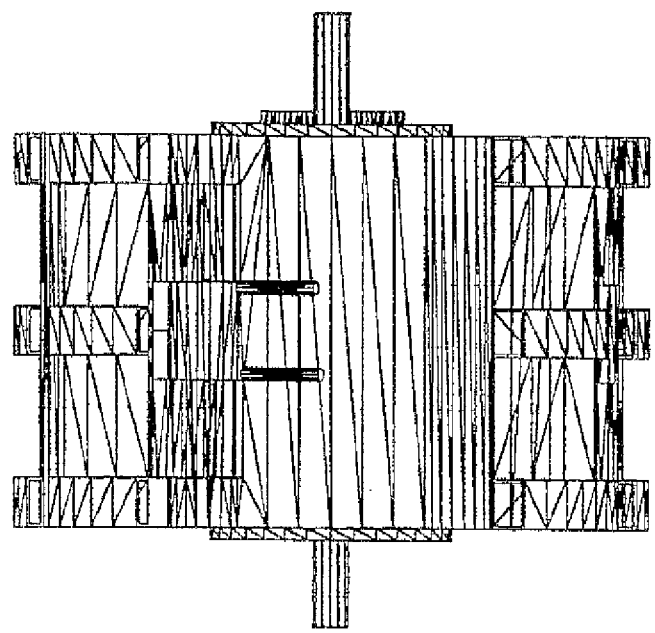
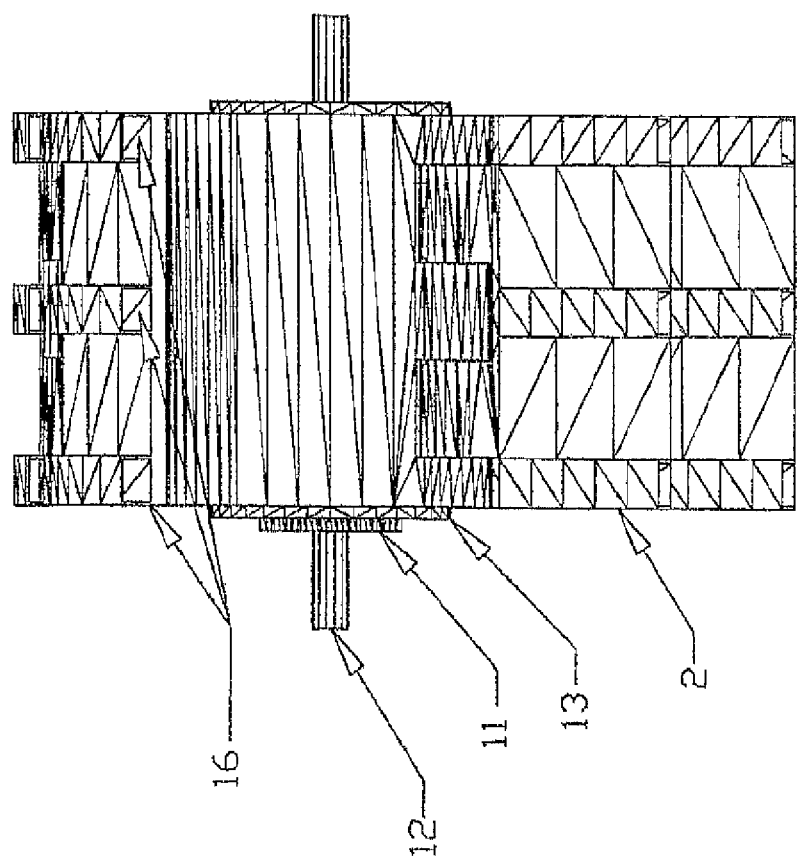
Fig 3

AMPHIBIOUS PADDLE TRACK PROPULSION SYSTEM

CROSS REFERENCE TO RELATED APPLICATIONS

This application is a continuation-in-part of application Ser. No. 12/454,855 filed May 27, 2009 now abandoned which claims the benefit of provisional patent application Ser. No. 61/131,473 filed Jun. 9, 2008.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a paddle track propulsion system, and more particularly, to a self engaging track paddling propulsion system for adaptation to any type vehicle to allow the vehicle to drive over land or water making the vehicle amphibious.

2. Description of the Background Art

There are several amphibious vehicles known for travel over land and, or water. Water bicycles that employ paddles are known as well. There are also a variety of water vessels that employ propulsion systems that are not meant for land use. The amphibious vehicles known require a water-tight body as they are partially submerged when driven in water. These amphibious vehicles fail to employ a retractable paddle and track system. In addition, these vehicles and devices are not adapted for use on any type of vehicle to make it amphibious. If a retractable paddle track system were available for converting any vehicle into an amphibious vehicle without requiring a water tight body it would be well received for recreational, military, police and rescue use. However, there are no such systems known.

As noted, there are a variety of land, water and amphibious vehicles disclosed in the prior art. With respect to amphibian vehicles, U.S. Pat. No. 2,416,128, issued to Swennes, discloses an amphibian vehicle having a watertight body and a track and series of treads for locomotion. Swennes has tracks on both sides of the vehicle with lugs and grousers and sprockets that are used to propel the vehicle through water. U.S. Pat. No. 2,878,883, issued to France et al., discloses an amphibian vehicle having a buoyant watertight hull with a vehicle cab superimposed thereon. The France et al. includes a propeller and steering rudder for propulsion through water and front and rear traction assemblies for moving the vehicle over rough terrain. U.S. Pat. No. 2,916,006, issued to Crandal, discloses an amphibian vehicle having a watertight body, rudder and series of roller bags or wheels that are inflatable to provide desired flotation of the vehicle on unstable soils such as sand, swamps, mud and the like. Each, roller bag of the bottom lay has an effective pressure area to water for exerting a pressure force against the water advance the vehicle. The watertight body together with the inflatable roller bags provide for flotation of the vehicle. U.S. Pat. No. 3,353,618, issued to Fisher, discloses an all terrain articulated vehicle having two similar four-wheeled or two-tracked vehicle bodies wherein the vehicle bodies are articulately connected by a universal joint. Fisher includes tracks around pairs of wheels with a series of treads for locomotion.

Several paddle driven vehicles are also known in the background art. For instance, U.S. Pat. No. 4,511,338, issued to Fanelli, discloses a water bicycle and detachable device for converting a sail board into a water bicycle. The water bicycle has a flotation member and a frame removably mounted to the flotation member and pedals rotatably mounted to the frame. Paddle wheels are provided on either side of the frame and are interconnected with the pedals so as to be rotatably driven by the pedals. U.S. Pat. No. 5,226,843, issued to Yun, discloses an amphibian bicycle including a bicycle body, two pairs of air tubes, air tube supporting members, a pair of wheels wherein the rear wheel is fitted with a plurality of paddles or wheel webs, front brake locking member, a rear brake pad lifting member and a ratchet gearing stopper. For land operation, the air tubes, air tube supporting members, the direction controller, and the wheel webs are separated from the amphibian bicycle. U.S. Pat. No. 6,083,065, issued to Hall, discloses a paddle wheel propulsion device kit which can be removably affixed to a canoe and like watercraft. A folding and removable paddle wheel fender prevents water from entering the watercraft while moving under power. The propulsion power includes a chain drive from a bicycle type mechanism with soft pedals and removably anchored inside the watercraft.

Lastly, a variety of propulsion systems for water vessels are known in the background art. For instance, U.S. Pat. No. 121,738, issued to Whitehead, discloses a propulsion system for canal-boats having a series of blades or paddles attached to and operated by an endless band or chain, the blades being operated within a channel in the bottom of the boat and constructed so they remain in a vertical position when moving from stern to stern of the boat. U.S. Pat. No. 464,621, issued to Fisher, discloses a propulsion system for water vessels having a plurality of vanes or propellers attached to an endless chain consisting of a series of links adapted to be engaged by sprocket wheels. U.S. Pat. No. 921,823, issued to Gays, discloses a boat propulsion system having two members arranged at wither side of the hull of the vessel, wherein in each member there has a plurality of paddles or buckets, driving means for driving the paddles, a bucket carrier for each of the members and a bucket trip means. The paddles or buckets are caused to traverse, in each member, paths of travel in a horizontal plane. Finally, U.S. Pat. No. 1,729,974, issued to Watson, discloses a propeller for driving water vessels in opposite directions without reversing the direction of the propeller travel. Watson's propeller includes an endless propeller chain adapted to travel over a pair of spaced sprocket wheels mounted on drive shafts, a chain having sprocket links and connecting links having outstanding portions rotatably secured to paddles or vanes. A single chain and paddle structure as described is secured on each side of the water vessel.

As can be seen, the foregoing patents fail to disclose a self engaging track paddling propulsion system for adaptation to any type vehicle to allow the vehicle to drive over land or water. The foregoing patents also fail to teach a track paddling propulsion system having collapsible or retractable paddles for allowing travel over land wherein the paddles are extendable for water locomotion. In addition, the background patents fail to teach a water propulsion system wherein only the paddles are exposed to and engage the water to avoid unnecessary drag. If there was such a propulsion system it would address the shortcomings in the background art and be well received for use in recreation, the military and by rescue personnel. As there are no known amphibious propulsion system having these specifications and attributes, there exists a need for such a device. It is, therefore, to the effective resolution of the aforementioned problems and shortcomings of the prior art that the present invention is directed. The instant invention addresses this unfulfilled need in the prior art by providing a fishing rod holder for jet skis as contemplated by the instant invention disclosed herein.

BRIEF SUMMARY OF THE INVENTION

In light of the foregoing, it is an object of the present invention to provide a self engaging track paddling propulsion system to allow a vehicle to travel on land or water.

It is also an object of the instant invention to provide an amphibious track paddling propulsion system having retractable paddles for allowing a vehicle to travel on land.

It is another object of the instant invention to provide an amphibious track paddling propulsion system having extendable paddles for allowing a vehicle to travel on water.

It is an additional object of the instant invention to provide an amphibious track paddling propulsion system designed so that only the paddles engage the water to avoid unnecessary drag.

It is a further object of the instant invention to provide an amphibious track paddling propulsion system that is adaptable for use and mounting on any type of vehicle or vessel.

It is yet a further object of the instant invention to provide an amphibious track paddling propulsion system that is adaptable for use and mounting on any floater.

It is yet another object of the instant invention to provide an amphibious track paddling propulsion system that may be powered by peddling.

It is yet an additional object of the instant invention to provide an amphibious track paddling propulsion system that may be powered by a motor.

In light of these and other objects, the instant invention comprises an amphibious self-engaging paddle track propulsion system that may be mounted on any floater, water vessel or other vehicle for enabling the ability to selectively travel over land or water. The amphibious paddle track propulsion system generally comprises an elongated endless paddle track, a plurality of spring-loaded paddles, a plurality of paddle supporting terrain treads, a plurality of circular terrain treads, a drive sprocket, a chain sprocket on the drive sprocket, a rear sprocket, a frame, a drive sprocket axle and a rear sprocket axle. The paddle track comprises a flexible or hinged material and together with the frame supports the aforementioned components. The circular terrain treads are secured to the paddle track in traverse orientation with respect to the track and along the periphery of the track. Each paddle comprises a torque spring having the necessary amount of torque to maintain the paddle parallel to the paddle track for terrain locomotion and to yield to water pressure for water locomotion. Each paddle comprises an L-shape body wherein the long leg of the paddle is the actual paddle that engages water and the short portion of the leg is the halter. The halter and paddle are hinged together for allowing the retraction and extension of the paddle for land and water locomotion, respectively. Each paddle has two halters that fit through corresponding cutouts defined by the circular terrain treads and is secured to the track and terrain tread by a paddle hinge shaft that passes through a tread hinge aperture and a corresponding paddle aperture when properly aligned. The halter of the paddle rests on the inner surface of the track and halts the paddle in a substantially perpendicular position with respect to the track for water locomotion.

The paddle track propulsion system may be mounted to any vehicle, vessel or floater, such as a surf board, for allowing travel by land or water. The paddle track propulsion system comprises paddles that are extendable and collapsible or retractable. When traveling over water, the paddles are extended for engaging the water to pull it forward or backward. To travel over land, the paddles are collapsed or retracted. To traverse a vehicle, vessel or floater the track is caused to rotate over the sprockets by the drive sprocket. The drive sprocket is rotated by imparting power to the chain sprocket to move the track by pedaling or with a motor. When traveling over water only the paddles are engaged with or exposed to the water to prevent any unnecessary drag. The system may also be fitted with a seat.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 3 is an elevational view of the paddle assembly in position on the drive sprocket illustrating the water inlet apertures and in a second position illustrating the torque springs in accordance with the preferred embodiment of the instant invention.

DETAILED DESCRIPTION OF THE INVENTION

With reference to the drawings, FIGS. 1 to 11 depict the preferred embodiment of the instant invention which is generally referenced as a paddle track propulsion system. The track propulsion system is an amphibious self engaging paddle track mountable to any floater, vessel or vehicle for terrain and water locomotion. When traveling on the water, the paddle track propulsion system makes minimal contact with the water thereby negating unnecessary drag by only making the contact necessary to effectuate movement. The paddle track propulsion system may be powered by pedaling or with the use of a motor. The paddle track propulsion system provides a for machine for amphibian propulsion unlike prior attempts in the background art.

Figure 1:
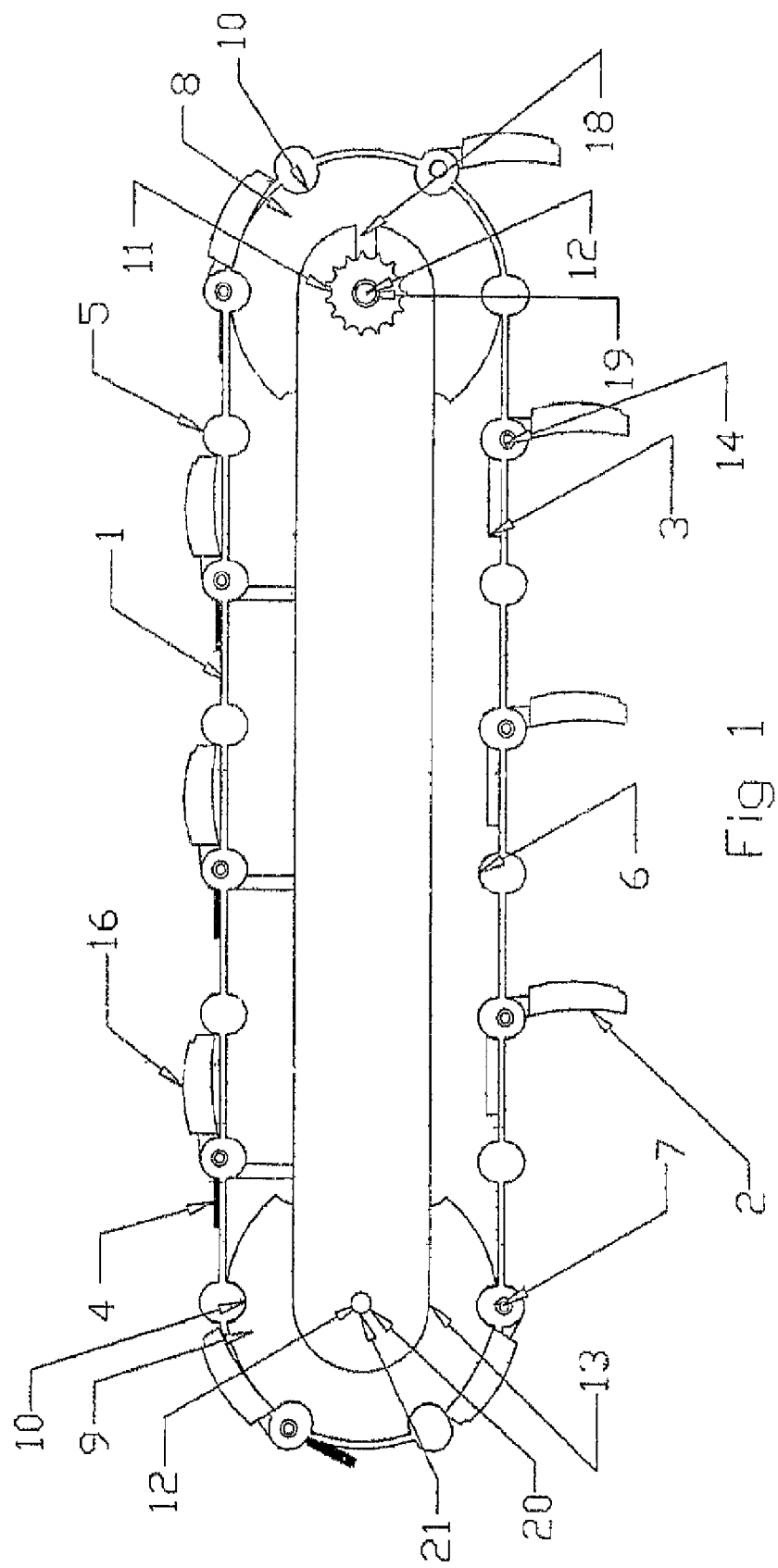
FIG. 1 is an elevational view of the preferred embodiment of the paddle track propulsion system in accordance with the instant invention.
Figure 2:
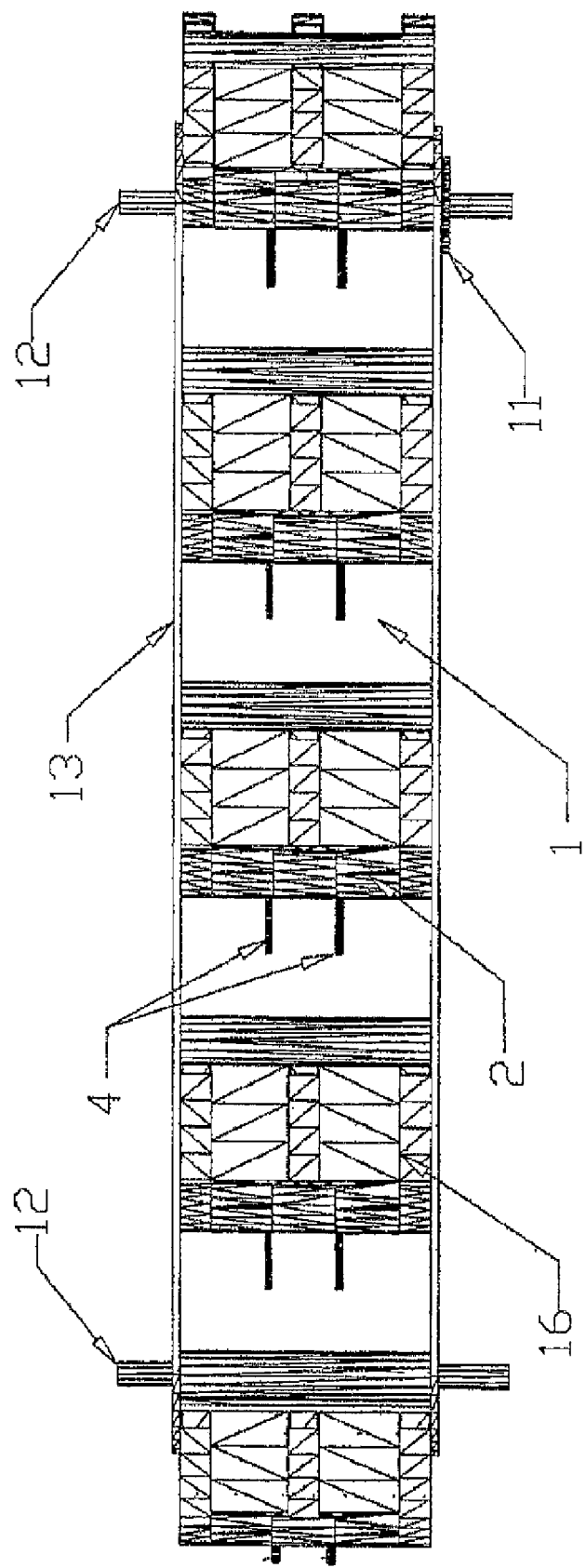
FIG. 2 is a plan elevational view of the preferred embodiment of the paddle track propulsion system in accordance with the instant invention.
Figure 4:
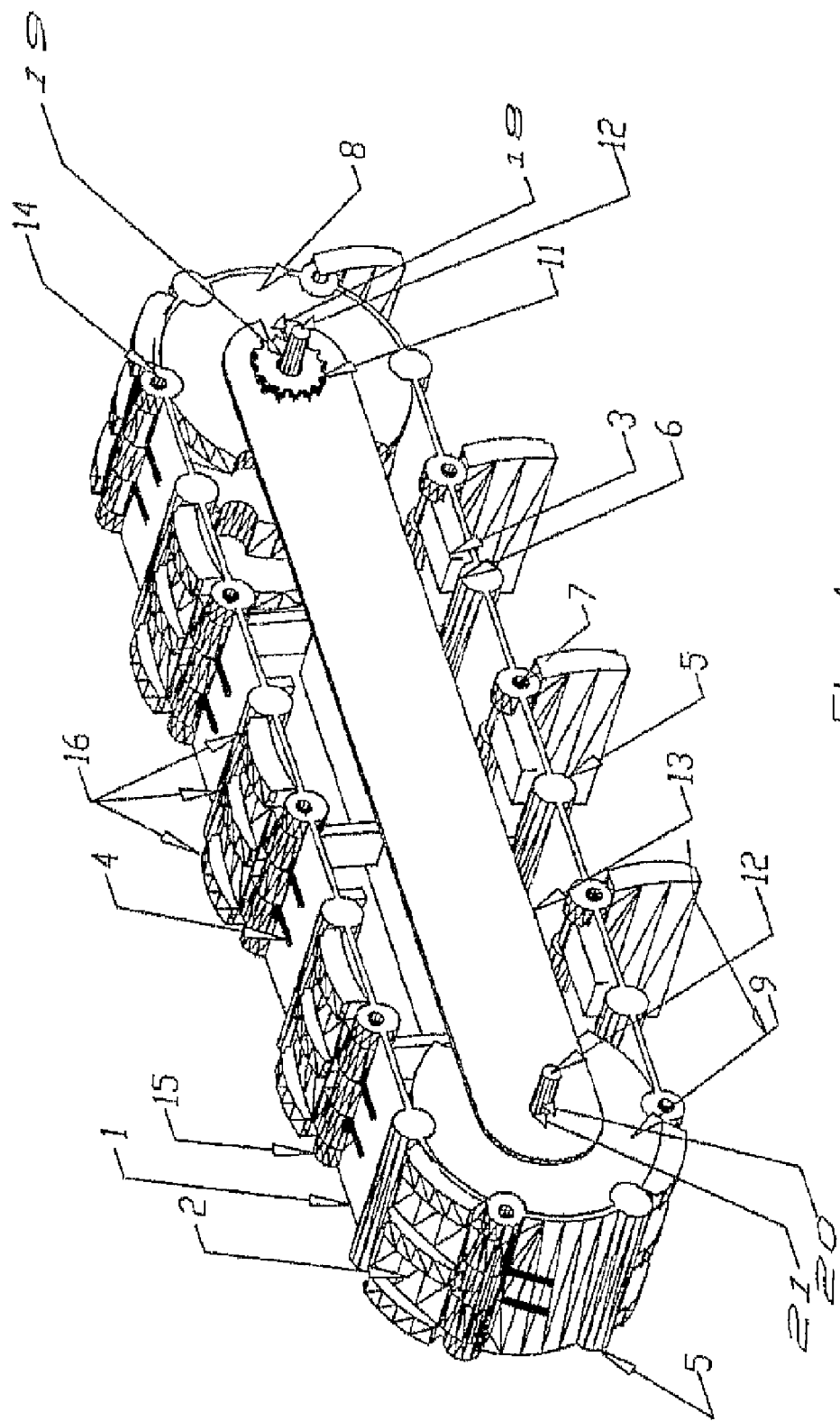
FIG. 4 is a perspective view of the preferred embodiment of the paddle track propulsion system in accordance with the instant invention.
Figure 5:
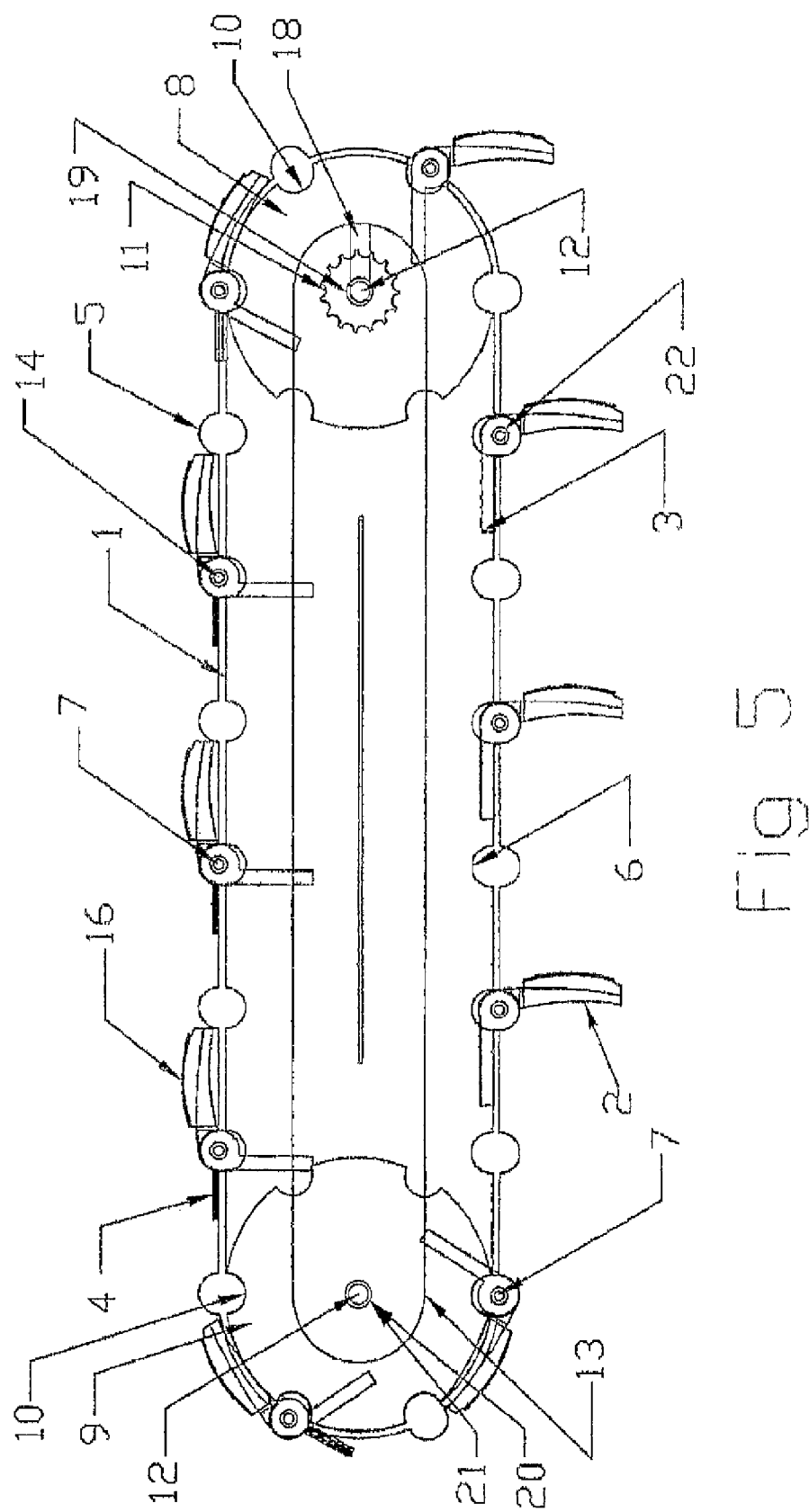
FIG. 5 is a side elevational view of the preferred embodiment of the paddle track propulsion system in accordance with the instant invention.
Figure 6:
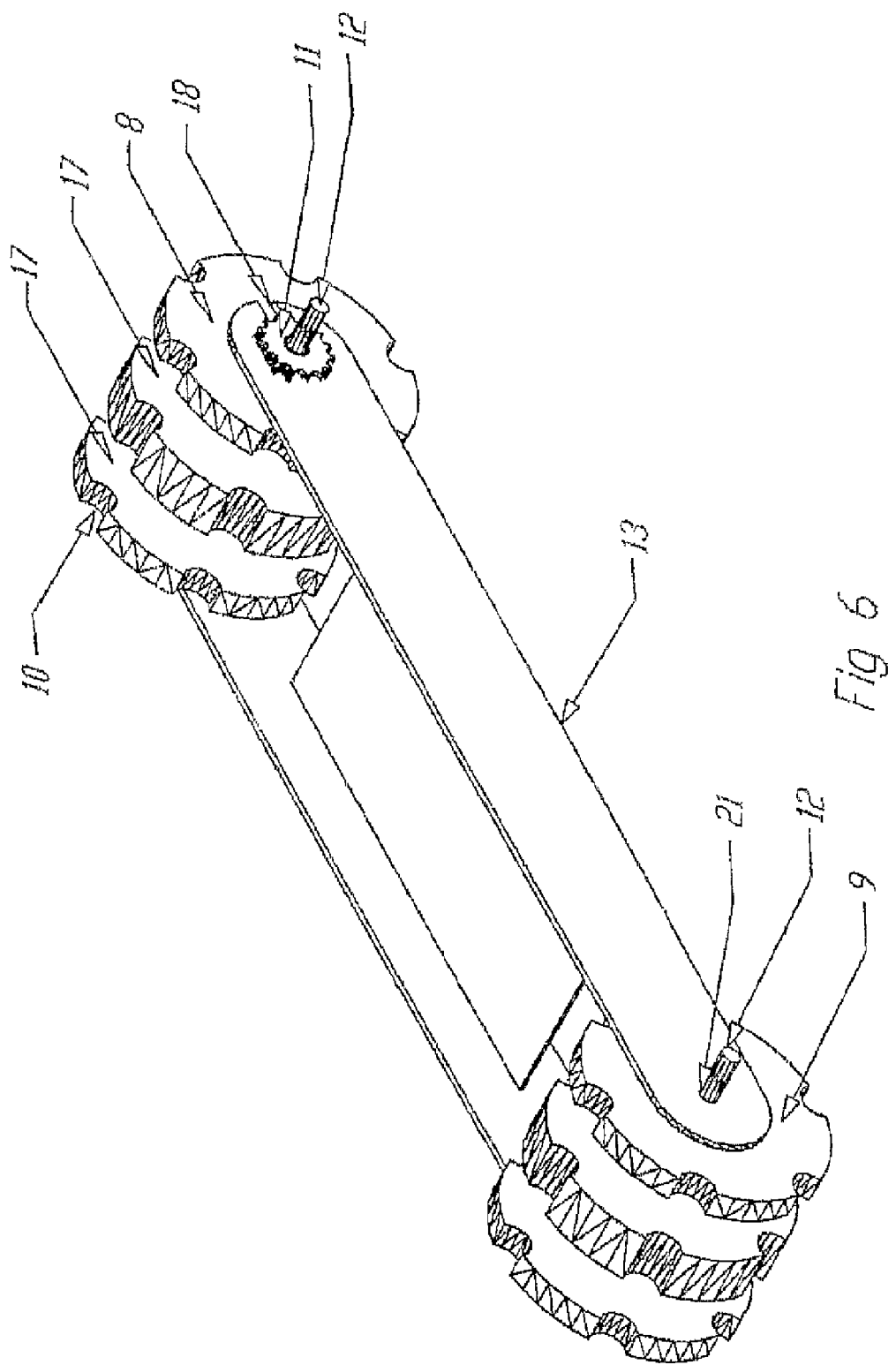
FIG. 6 is a perspective view of the drive sprocket, rear sprocket and frame assembly of the paddle track propulsion system in accordance with the preferred embodiment of the instant invention.

With reference to FIGS. 1-11, the amphibious self-engaging paddle track propulsion system generally comprises an elongated endless paddle track 1, a plurality of spring-loaded paddles 2, a plurality of paddle support terrain treads 5', a plurality of circular terrain treads 5, a drive sprocket 8, a chain sprocket 11 on the drive sprocket 8, a rear sprocket 9, a frame 13, sprocket axles 12 for the drive sprocket 8 and a rear sprocket 9. The paddle track 1 comprises a flexible or hinged material and together with the frame 13 supports the aforementioned components. The frame 13 has notches at its ends for engaging the sprockets 8, 9. The paddle track 1 is elongated along a horizontal axis and is three dimensional. The circular terrain treads 5 and paddle support treads 5' are secured to the paddle track 1 in traverse orientation with respect to the track and along the periphery of the track 1. The track 1 alternates between the terrain treads 5 and paddle support treads 5'. The terrain tracks 5 traverse the outer periphery of the paddle track 1 in desired spatial relation for effecting terrain traction wherein a certain number of terrain treads 5' define cutout configurations for receiving and supporting the paddle assemblies 2. The circular and paddle support treads 5, 5' each define a tread hinge aperture 7 along their longitudinal center axis for attaching the a paddle with a paddle hinge shaft 14, as shown in FIGS. 4, 5, 7 and 10. The paddles 2 define a corresponding paddle hinge aperture 22 for receiving the paddle hinge shaft 14 when properly aligned with the tread hinge aperture 7. Referring to FIGS. 1 and 4, the inner periphery of the paddle track 1 comprises a plurality of circular gear teeth 6 for engaging circular gear roots 10 formed in the drive gear sprocket 8 and rear gear sprocket 9. The gear teeth 6 have the exact same pitch diameter and number of teeth as those in the gear roots 10 for effectuating proper meshing. The gear track teeth 6 are transverse to the track 1 and disposed in the outer periphery of the paddle track 1 Still referring to FIGS. 1 and 4, the paddle track 1 having the paddles and terrain treads 5, 5' is mounted to the cylindrical sprockets 8 and 9.

Figure 7:
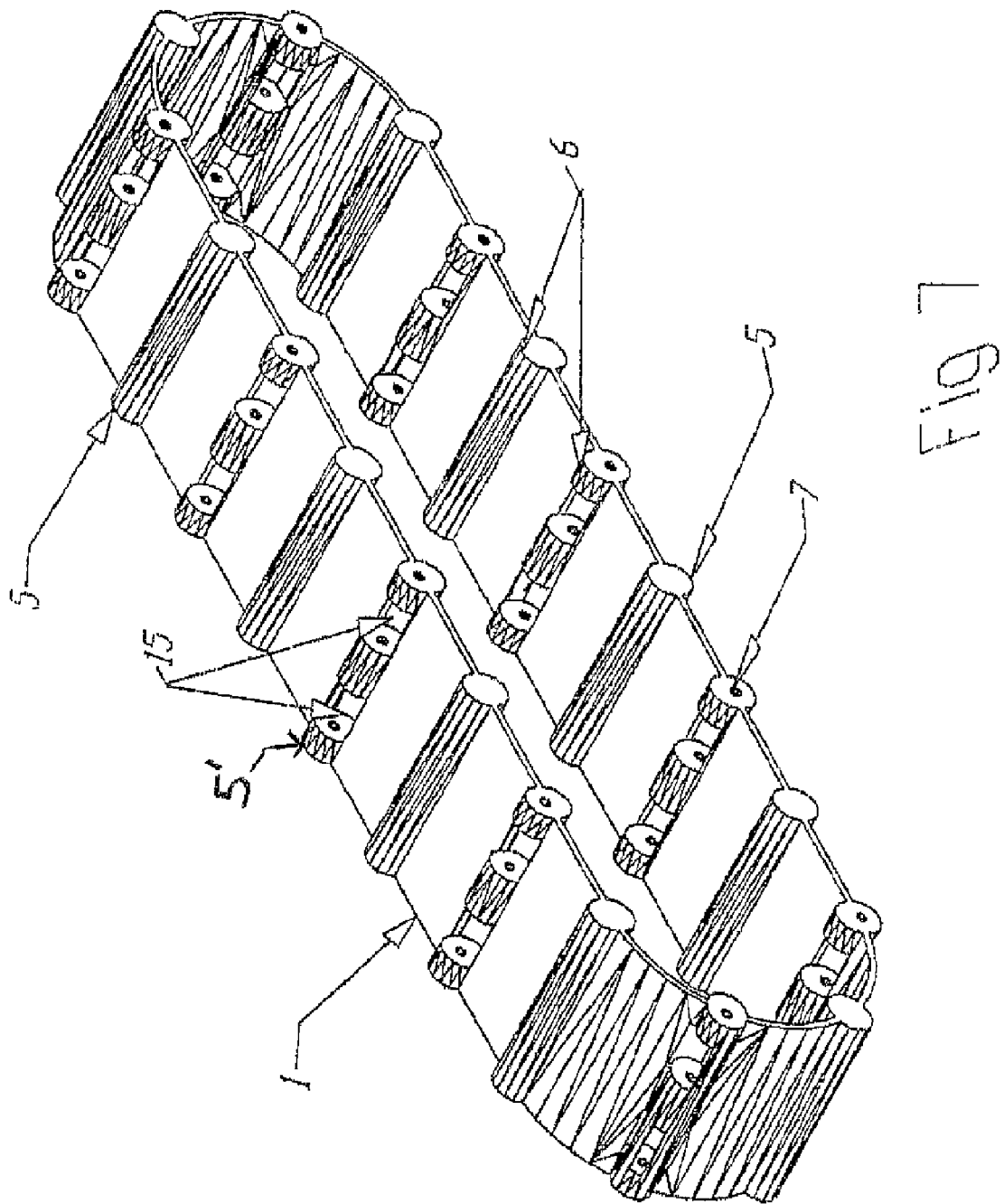
FIG. 7 is a perspective view of the paddle track, paddle support terrain treads and circular terrain treads assembly of the paddle track propulsion system in accordance with the preferred embodiment of the instant invention.
Figure 8:
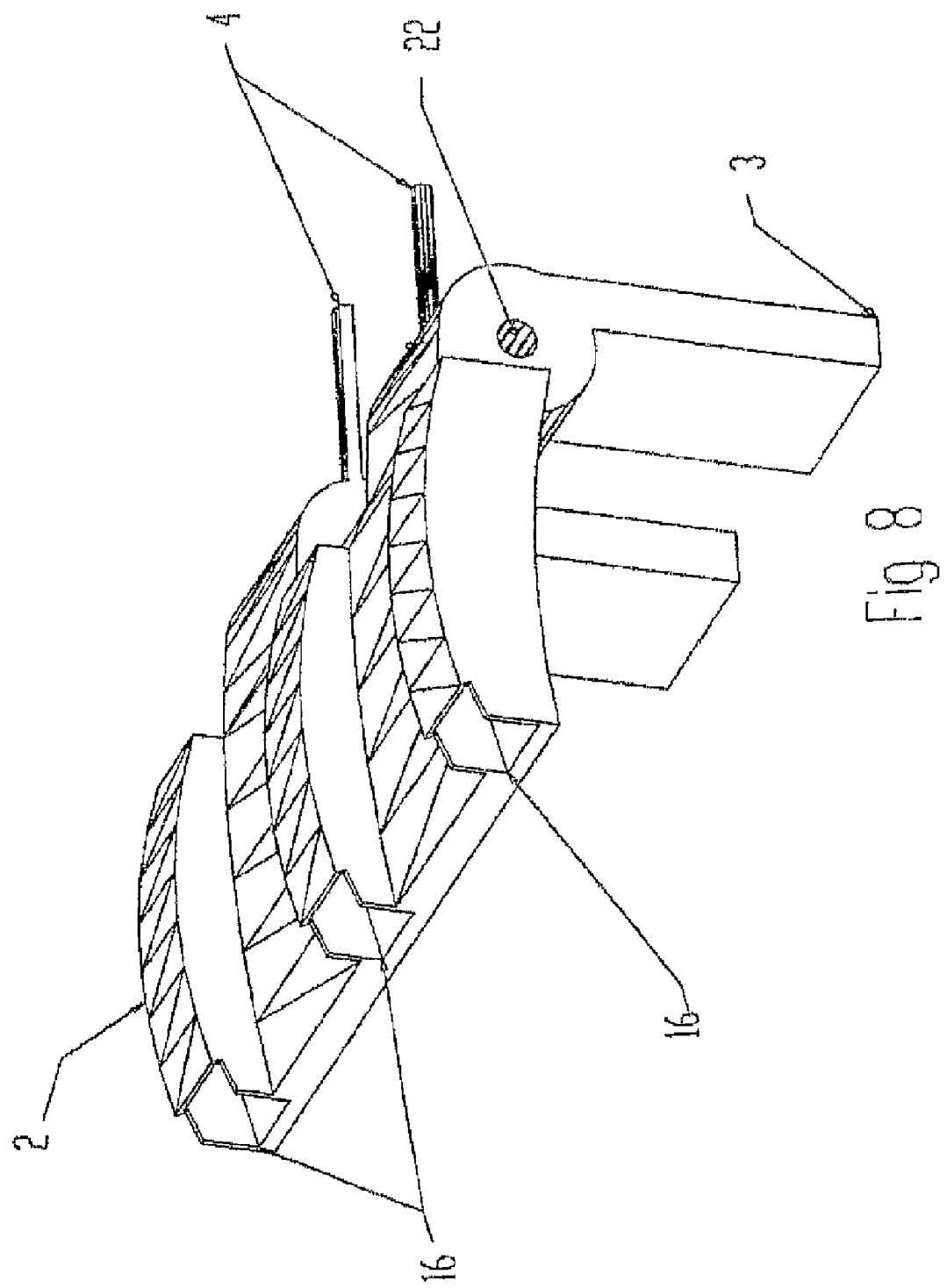
FIG. 8 is a perspective view of the paddle assembly of the paddle track propulsion system in accordance with the preferred embodiment of the instant invention.
Figure 9:
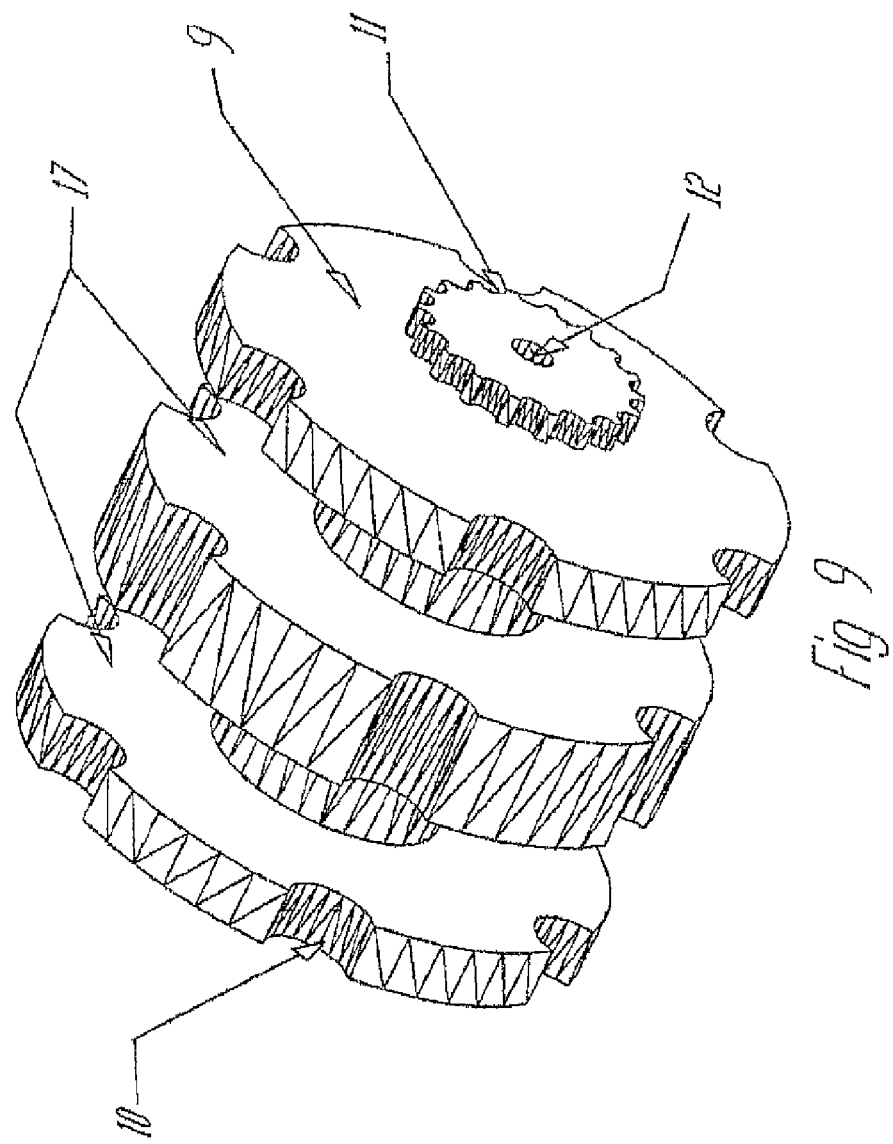
FIG. 9 is a perspective view of the drive socket of the paddle track propulsion system in accordance with the preferred embodiment of the instant invention.
Figure 10:
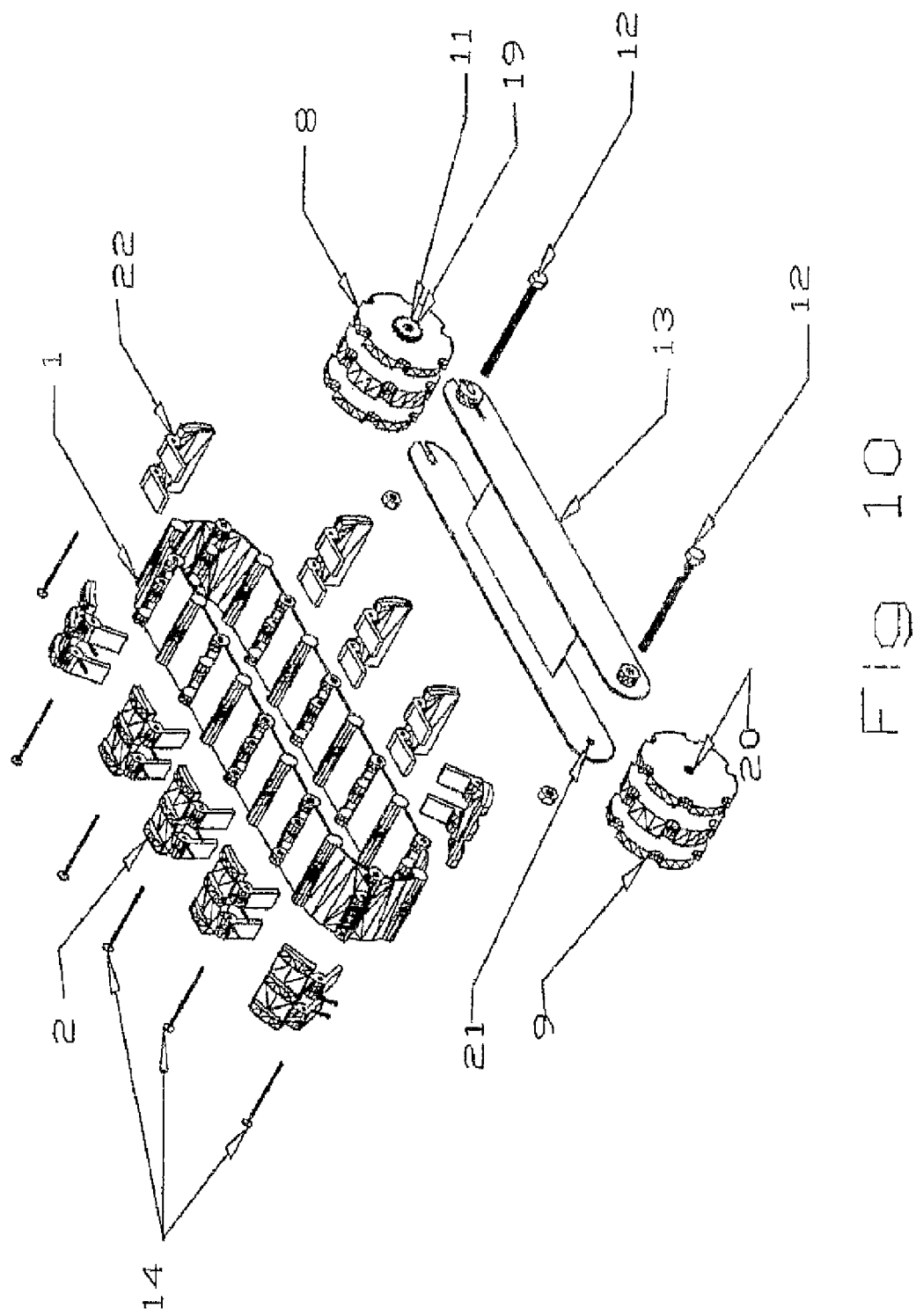
FIG. 10 is an exploded perspective view of the preferred embodiment of the paddle track propulsion system in accordance with the instant invention.
Figure 11:
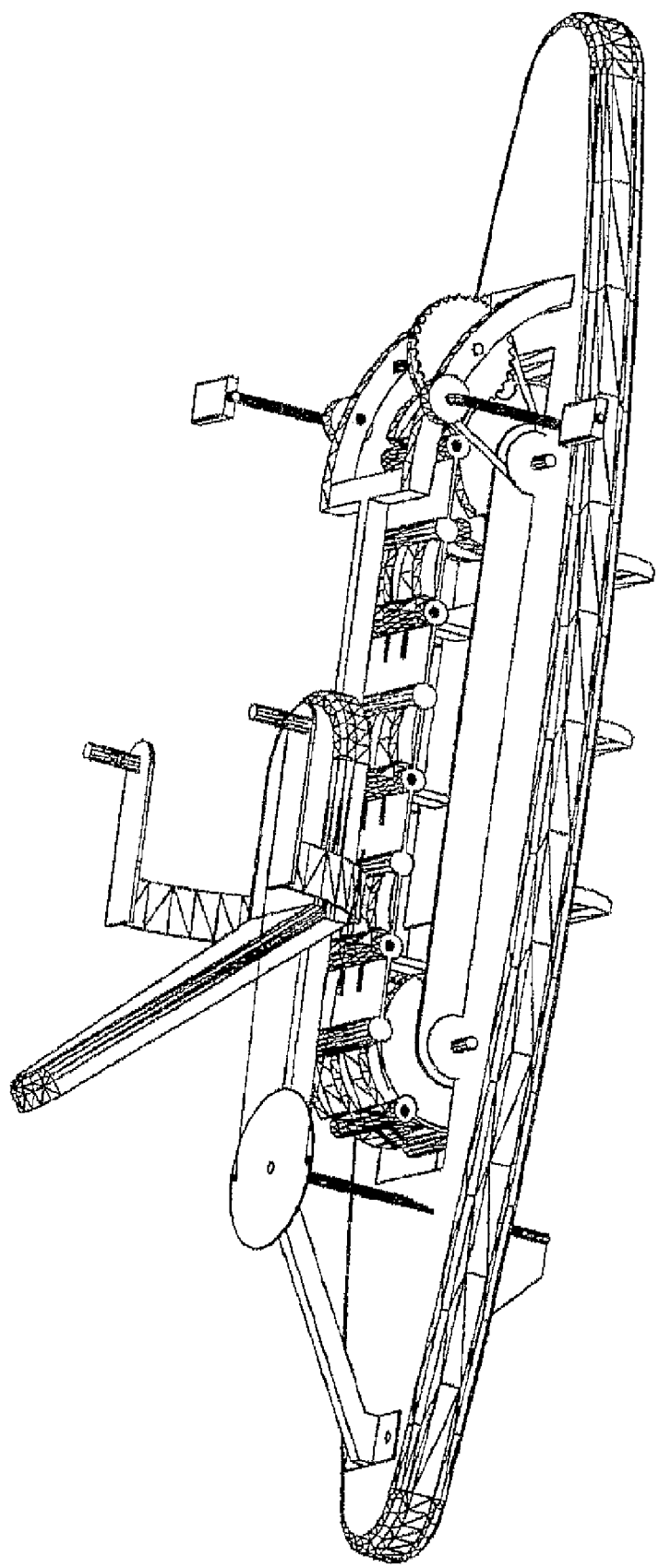
FIG. 11 is a perspective view of the preferred embodiment of the paddle track propulsion system mounted to a floater and fitted with a seat in accordance with the instant invention.

The paddles 1 are manufactured from a flexible, semi-rigid or rigid material. Each paddle 2 comprises an L-shape body wherein the long leg of the paddle 2 is the actual paddle 2 that engages water and the short leg is the halter 3. The paddle 2 has a given width and a partial circular tread for engaging the sprocket gear roots 10 in the sprockets 8, 9. The circular terrain tread portion of the paddle 2 comprises an aperture along the longitudinal center axis 22 for attaching the paddle 2 to a support terrain tread 5' on the paddle track 1 with a hinge shaft 14, as shown in FIG. 10. Each paddle assembly 2 also comprises three water inlet apertures 16 on the top area of the paddle 2 to initiate the paddle 2 to engage the water for water locomotion through paddle track 1 rotation and water pressure when the leading edge of the paddle 2 engages the water. The halter 3 and paddle 2 are hinged together for allowing the retraction and extension of the paddle 2 for land and water locomotion, respectively. The halter 3 is substantially at a right angle to the paddle 2 and halts the paddle 2 in a perpendicular orientation with respect to the water by resting against the inner surface of the paddle track 1 during water locomotion. As best seen in FIGS. 7 and 10, the paddle support treads 5' define cutouts 15 for receiving the halter 3 allowing them to engage the inner surface of the track 21. Each paddle has two halters 3 that fit through the corresponding cutouts 15 defined by the circular terrain treads 5' and is secured to the track and terrain tread 5' by the paddle hinge shaft 14 that passes through the tread hinge aperture 7 and the corresponding paddle aperture 22 when properly aligned. Referring to FIG. 8, the torque springs 4 are molded with the paddle 2 along the longitudinal center axis of the paddle 2 to maintain it parallel to the paddle track 1 when retracted or collapsed for land locomotion until the paddle 2 is extended perpendicular to the track 1 under water pressure for water locomotion.

The drive cylindrical sprocket 8 is hermetically sealed for buoyancy. The drive sprocket 8 comprises a three part circular gear root 10 with a pitch diameter transverse to the drive cylindrical sprocket 8 corresponding to the paddle track circular gear teeth 6 pitch diameter. The drive sprocket 8 defines two open spaces 17 between the outer sprockets and center sprocket of the drive sprocket 8 and rear sprocket 9. The drive sprocket 8 has a chain sprocket 11 aligned concentrically to the drive sprocket aperture 19 of the drive sprocket 8. The chain sprocket 11 is attached to the outer surfaces of the drive sprocket 8, such as by welding or other known techniques and materials. The drive sprocket 8 has an aperture 19 along its longitudinal center axis and is suited for bearing seats that receive the axle. The rear sprocket 9 has the identical configuration as the drive sprocket 8 except with respect to the chain sprocket 11. The rear sprocket 9 defines a rear sprocket aperture 20 for receiving an axle 12 and a rear frame aperture 21 for attachment to the frame 13.

The chain sprocket 11 receives the power required for rotating the drive sprocket 8. As noted, a chain sprocket 11 is attached to the outer surface of the drive sprocket 8. The axle 12 is journaled and threaded on opposite sides for insertion through the frame 13 cylindrical sprocket apertures 8, 9. The frame is horizontally elongated with predetermined dimensions. The leading edge of the frame 13 has a slotted aperture 18 traversing and along the longitudinal center axis of the frame 13 for receiving the drive sprocket 8. The trailing edge of the frame 13 has an aperture traversing and along the longitudinal center axis of the frame 13 for receiving the rear sprocket 9. The frame slotted aperture 18 allows for adjusting track 1 tension.

The paddle track propulsion system may be mounted to any vehicle, vessel or floater, such as a surf board, for allowing travel by land or water. The paddle track propulsion system comprises paddies that are extendable and collapsible or retractable. When traveling over water, the paddles are extended for engaging the water to pull it forward or backward. To travel over land, the paddles are collapsed or retracted. To traverse a vehicle, vessel or floater the track is caused to rotate over the sprockets by the drive sprocket. The drive sprocket is rotated by imparting power to the chain sprocket to move the track by pedaling or with a motor. When traveling over water only the paddles are engaged with or exposed to the water to prevent any unnecessary drag. The system may also be fitted with a seat.

The instant invention may also include a chain mounted to the chain sprocket and either a pedal assembly or electronic motor in mechanical communication with the chain to rotate the chain sprocket and impart rotational movement of the chain sprocket and hence the drive sprocket. The chain may comprise an alternative structure designed to engage the chain sprocket so as to impart rotational movement of the chain sprocket and drive sprocket.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. An amphibian paddle track propulsion system for enabling a floatation device, vehicle or vessel to travel on land and water, said system comprising:
   a drive sprocket;
   a rear sprocket;
   a frame joining and separating said drive sprocket and said rear sprocket at a predetermined distance;
   an endless paddle track mounted over and around said drive sprocket and said rear sprocket;
   means for rotating said drive sprocket;
   a plurality of terrain treads transversely joined to said track in predetermined spatial relation;
   a spring loaded paddle assembly mounted to predetermined terrain treads from said terrain treads, said paddle assembly comprising a paddle hinged to a halter plate, said halter plate being securely disposed on an inner surface of said track, said paddle being collapsible and extendable with respect to said halter plate and said paddle track.

2. A system as recited in claim 1, further comprising:
   a plurality of terrain treads being free of any said paddle assemblies.

3. A system as recited in claim 1, wherein said terrain treads each comprise at least one opening for receiving and passing said halter plate.

4. A system as recited in claim 1, further comprising:
   a first axle for rotatably securing said drive sprocket to said frame; and
   a second axle for rotatably securing said rear sprocket to said frame.

5. A system as recited in claim 1, wherein said frame comprise a slot at an end proximal said drive sprocket for adjusting the tension of said paddle track.

6. A system as recited in claim 1, wherein said means for rotating said drive sprocket comprises a chain sprocket disposed on an outer surface of said drive sprocket.

7. A system as recited in claim 6, further comprising:
   means, in mechanical communication with said drive sprocket, for rotating said chain sprocket to impart movement of said drive sprocket.

8. A system as recited in claim 7, wherein said means for rotating said chain sprocket comprises:
   a chain in mechanical communication with said chain sprocket; and
   chain sprocket power means, in mechanical communication with said chain, for moving said chain to impart rotational movement of said chain sprocket.

9. A system as recited in claim 8, wherein said chain sprocket power means comprises:
   a pedal assembly, in mechanical communication with said chain, for routing said chain by means of a person.

10. A system as recited in claim 8, wherein said chain sprocket power means comprises:
    an electric motor, in mechanical communication with said chain, for rotating said chain.

* * * * *